May 15, 1945.  C. W. NICHOLS, JR  2,376,177

FURNACE

Filed Dec. 21, 1943  3 Sheets-Sheet 1

INVENTOR.

CHARLES W. NICHOLS, JR.

Ward, Crosby + Neal

ATTORNEYS.

May 15, 1945.  C. W. NICHOLS, JR  2,376,177
FURNACE
Filed Dec. 21, 1943   3 Sheets-Sheet 2

INVENTOR.
CHARLES W. NICHOLS JR.
BY
*Ward, Crosby & Neal*
ATTORNEYS.

May 15, 1945. C. W. NICHOLS, JR 2,376,177
FURNACE
Filed Dec. 21, 1943 3 Sheets-Sheet 3
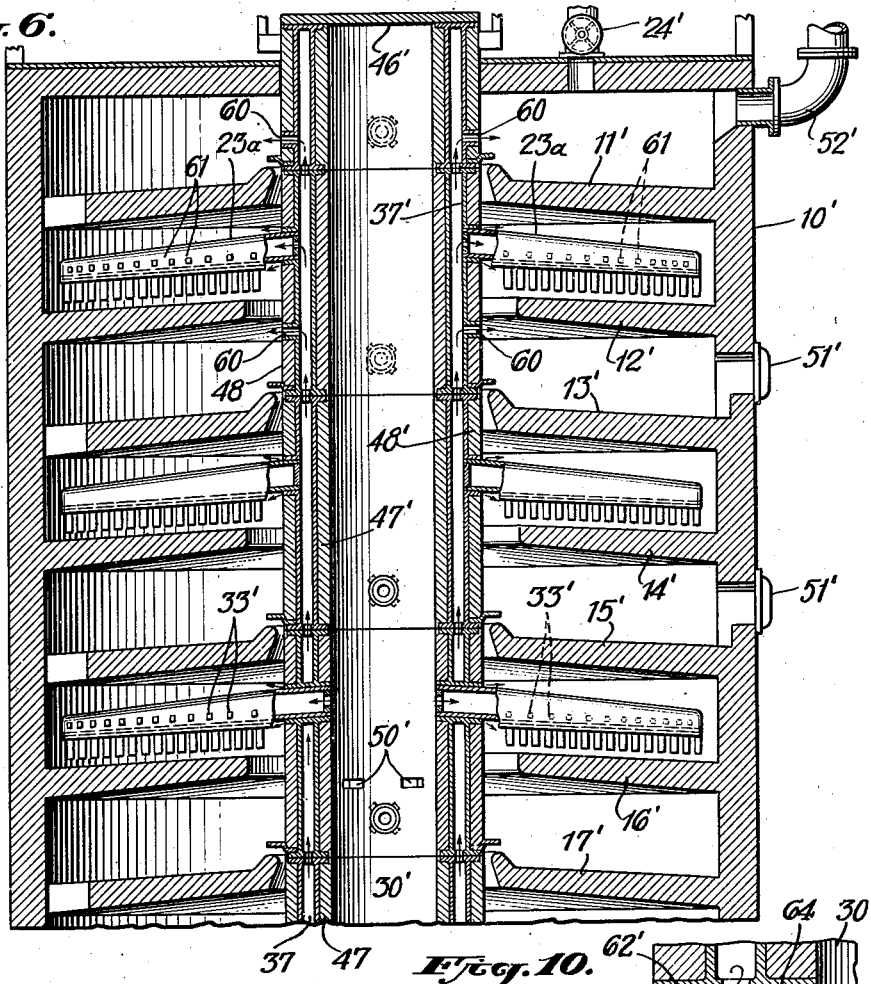
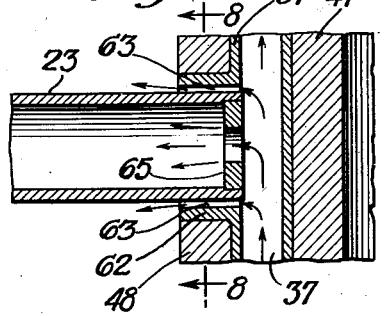
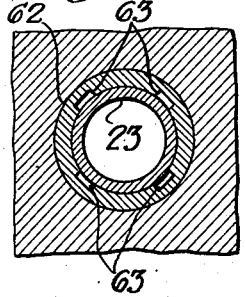
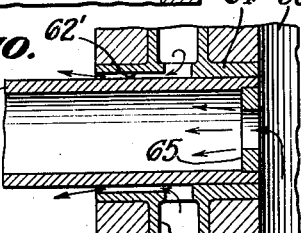
INVENTOR.
CHARLES W. NICHOLS JR.
BY
ward, Crosby + neal
ATTORNEYS.

Patented May 15, 1945

2,376,177

UNITED STATES PATENT OFFICE 2,376,177

FURNACE

Charles W. Nichols, Jr., New York, N. Y.

Application December 21, 1943, Serial No. 515,107

13 Claims. (Cl. 75—34)

This invention relates to furnace constructions, more particularly furnaces of the multiple superposed hearth type, and to methods utilizing such furnaces for the roasting of various materials therein.

Multiple hearth furnaces of the so-called Herreshoff type have long been used for the roasting of sulphide ores, and other ores and materials which are required to be subjected to oxidizing or drying processes. In such furnaces a rotatable vertical central shaft is provided carrying generally horizontally extending rabble arms with teeth for rabbling the material under treatment over each hearth and from hearth to hearth down through the furnace. It has been the general practice to provide a cooling fluid conduit within the central shaft communicating with conduits within the rabble arms for carrying cool air out to the ends of the rabble arms, the air flowing thence back within the annular spaces around the cooling conduits to a point of discharge from the top or bottom of the central shaft.

The present invention involves important modifications of such furnace structures, adapting same for subjecting materials such as iron ore to a reducing treatment, or other materials to a chemical reaction requiring application of hot air or gas thereto. For example, with the present invention, iron ore such as magnetites, hematites, pyrites, or roll scale, etc., may be heated in the furnace by applying thereto streams of hot coke oven gas, or other reducing gas, whereby the ore is reduced to metallic iron. This reducing action may require a temperature of 1300° F., or somewhat higher. According to the present invention, the heating is accomplished by way of preheating the reducing gas and by conducting all or part of the hot gas through the rabbling structure, and then discharging same from the rabble structure on to the ore being treated on the furnace hearths.

Such a procedure for applying hot gas to the ore involves problems which so far as I am aware, have not heretofore been solved or even met with in the construction and operation of multiple hearth furnaces. That is, instead of merely circulating cooling air through the rabbling structure, it is necessary to conduct hot gases therethrough and at the same time afford some means for protecting at least the shaft structure against damage from the hot gases, as well as against the high temperatures in the furnace. Also in case the hot gas to be introduced is readily combustible with air, the usual method of air cooling the rabbling structure would be dangerous or at least likely to cause serious difficulties in the event of leakage of the air into the presence of the reducing gas or vice versa, at shaft joints or arm sockets, etc.

According to the preferred embodiments of the present invention, the preheated gases may be introduced through the rabbling structure into the furnace, and the shaft is protected from the heat of such gases as well as from the heat of the furnace, by passing a relatively cool gas through an annular space in the shaft surrounding the hot gas conduit. The cooler gas is preferably of the same kind as the hot gas, so that no difficulty will arise if some of the cool gas should mix with the hot gas at leakage points, etc.. Furthermore, the cooling gas upon passing through the structure, becomes heated to a certain extent and hence is well adapted to be then introduced into the furnace or into the hot gas stream supply line, thereby utilizing its heat. Preferably to further insure protection of the shaft against the high temperatures, insulating coverings are applied respectively to the inside surface of the hot gas conduit and to the outside surface of the shaft, so that the cooler gas stream contacts directly with both the metal of the shaft and of the conduit therein, whereas the hot gas is kept out of direct contact with both. Such insulation thus also prevents any substantial cooling of the desired hot gas stream, by the cooling stream.

Various further and more specific objects, features and advantages will clearly appear from the detailed description given below taken in connection with the accompanying drawings which form a part of this specification and illustrate by way of example a preferred form of the invention. The invention consists in such novel features and combinations of parts as may be shown and described in connection with the apparatus herein disclosed, and also such novel methods as are disclosed herein.

In the drawings,

Fig. 6 is a vertical sectional view of the top portion of an alternative form of furnace embodying the invention;

Fig. 7 is a sectional view of an improved form of rabble arm socket which may be used in the furnaces of Fig. 1 or Fig. 6;

Fig. 8 is a sectional view taken substantially along line 8—8 of Fig. 7;

Fig. 9 is a face view of an orifice plate which may be used at the inlets of the rabble arms; and Fig. 10 is a view similar to Fig. 7 but showing an alternative structure.

Figure 1:
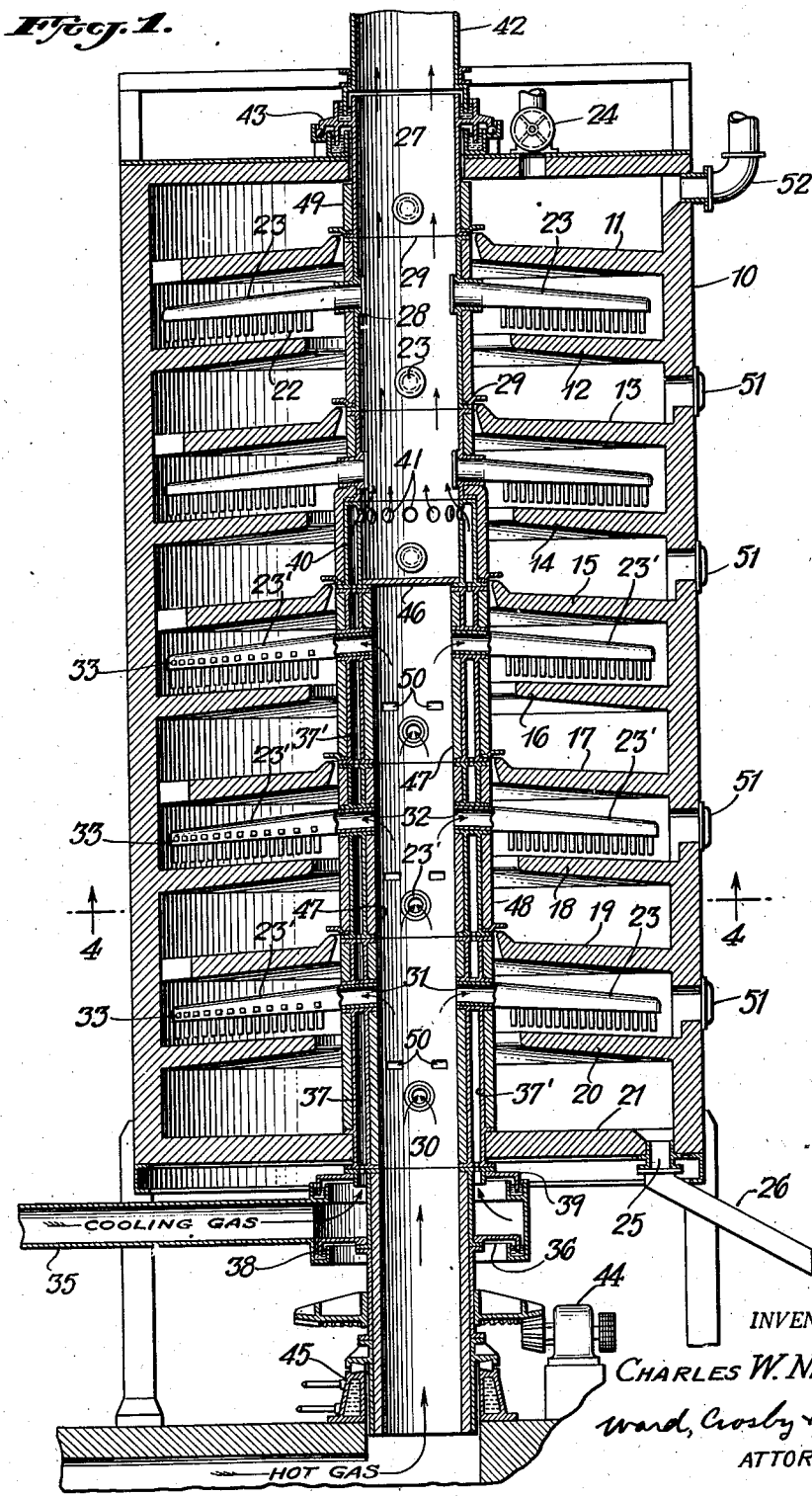
Fig. 1 is a vertical sectional view of a preferred form of furnace embodying the invention.

Referring to Fig. 1, the furnace here shown may comprise a cylindrical outer wall as at 10 enclosing a plurality of superposed hearths as at 11—21 inclusive, alternate hearths having the usual peripheral and central discharge ports as shown. Teeth as at 22 on rabble arms as at 23, 23' act to rabble the material under treatment over each hearth and from hearth to hearth down through the furnace. The material to be treated may be introduced at the top through a suitable known type of feeding device as at 24 arranged to exclude air from the furnace and to prevent escape of gas from the furnace. The treated material may pass out through an outlet as at 25 communicating with a conduit 26 through the bottom hearth. The rabble arms may as shown be carried on a central rotatable shaft as at 27, the shaft being formed with sockets as at 28, 32 of suitable known types for receiving the arms. The inner ends of the rabble arms 23 at the upper hearths 11—15 may be closed off as shown. The shaft 27 may be formed of a plurality of superposed sections with flanges joined together as at 29.

At least the lower portion 30 of the shaft 27 is arranged to form a hot gas conduit, communicating with the hollow spaces as at 31 within the rabble arms 23' at the lower hearths, for example the rabble arms at hearths 16—21 inclusive. These rabble arms may be formed with sockets as at 32 also of a well-known type, except that provision for internal cooling conduits within the arms may be omitted. Also the air ports heretofore provided for discharging air from the rabble arms into the annular space between inner and outer walls of the shaft, are omitted. While with prior constructions, air is passed from the central shaft conduit to the outer ends of the rabbles and thence back again to the annular shaft space, with the present invention no return gas passage need be provided. Instead, the hot gas from conduit 30 may be discharged from the rabble arms through a series of openings as at 33 arranged along each arm.

Figure 5:
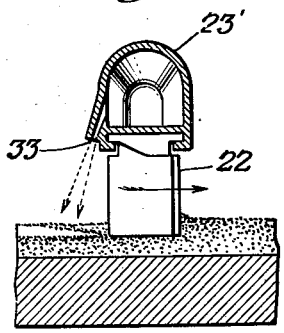
Fig. 5 is a cross-sectional view of one of the rabble arms.

As better shown in Fig. 5, the openings 33 are preferably positioned and shaped to direct the gas downwardly and rearwardly of the rabble teeth 22, to thus subject the fresh surfaces of the mass of material being treated to forceful jets of the gas just after each rabble tooth has passed. As shown in Fig. 1, the openings or apertures 33 may preferably be spaced more closely toward the outer ends of the rabble arms, so as to distribute about the same amount of gas per unit of hearth area, at both the inner and outer portions of the hearths. To the same effect, the openings of course might be uniformly spaced, but with larger and larger discharge apertures toward the outer ends of the rabble arms.

Cooling gas may be supplied as through a conduit 35 to a housing structure 36 rotatable with the central shaft, and thence to the annular space 37 between the shaft and an outer metal shell 37'. The shell 37' may if desired be considered as the lower part of the furnace shaft, and the portion 30 may be considered as a gas conduit therein. Water sealing means as at 38, 39 for example, may be provided for the interconnection of the conduit 35 and rotatable parts of housing 36. Similar sealing means, not shown, may if desired be provided for the introduction of the hot gas from a suitable source of supply into the lower end of the hot gas conduit 30.

The cooling gas may pass up through the annular space 37 to a region as at 40 above the point of termination of the hot gas conduit 30, and thence through apertures as at 41, and up through shaft 27 to an outlet conduit 42. The conduit 42 may be brought into communication with the rotating shaft 27 by means of a rotatable water-sealed connection 43 of a suitable known type.

The central shaft may be rotated in the usual way, as by gearing 44 beneath the furnace, and the lower end of the shaft may be supported by bearing means 45 of a suitable known construction, water-cooled if desired. The upper end of the hot gas conduit 30 may be closed off by a plate 46.

The inner wall surfaces of the conduit portion 30 are covered with one or more layers of insulation material as at 47. Similarly, the outer walls of the metal shell 37' are covered with suitable plastic refractory insulation as at 48, this covering preferably extending as at 49 up around the upper portions of the shaft also. Thus the hot gas in the conduit 30 is kept out of contact with the inner walls of the shaft, thereby protecting this metal against the high temperatures and at the same time preventing radiation of heat from the hot gas into the cooler surrounding stream of gas in the annular space 37. Also the outer metal shell 37', because of the insulation 48, is kept out of contact with the high temperature gases in the furnace and thereby effectively protected while preventing radiation of heat from the furnace into the cooler gas. However, the cooler gas in annular space 37 has direct contact with the metal walls of the shaft, as well as the shell 37' and thus all danger of injury of these parts by the high temperatures is avoided. The upper end of the shaft will also be internally cooled by the cooler gas stream and protected externally by the insulation 49.

It will be noted that the hot gases are brought into direct contact with the metal of the rabble arms and accordingly these arms should preferably be formed of a suitable heat resisting alloy. A well-known product available under the trade name of "Pyrocast" is suitable for this purpose. While such heat resistant alloys may readily be used for the rabble arms, the rotatable shaft must be quite large to have sufficient capacity to admit the required amount of hot gas, and therefore the use of high temperature resistant alloy for the shaft and conduit therein would ordinarily involve too great a cost and also excessive costs and difficulty of machining the numerous surfaces such as the joints between shaft sections and the arm bearing surfaces. Difficulties would also be encountered in casting the somewhat intricate shapes for the shaft sections, of heat resisting alloy. Also the resulting casting would be relatively brittle and subject to cracking due to the vibration and torsional strains of the large rotating shaft. For these various reasons, while the rabble arms may be readily formed of high temperature resistant alloy, such an expedient is impractical for the central shaft. Hence the above described facilities for using cooling gas therein are required as a practical matter, whereby the shaft may be formed of cast iron.

Figure 4:
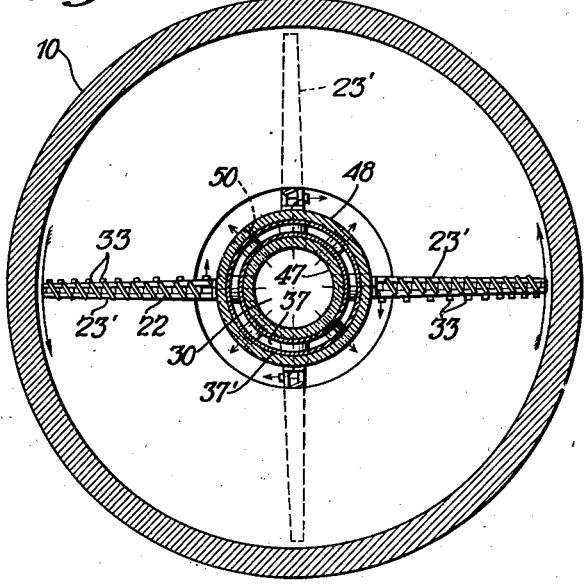
Fig. 4 is a horizontal sectional view taken substantially along line 4—4 of Fig. 1.

If desired, means may be provided for adjusting the gas outlet apertures 33 in the rabble arms as shown in U. S. Patent No. 2,302,841, granted November 24, 1942, to George E. Connolly. In case the amount of gas supplied through the apertures 33 to the material under treatment is insufficient, additional outlets as at 50 may be provided directly from the conduit portion 30 of the shaft. These are preferably arranged so as to discharge gas into the material as it falls from central ports of hearths such as Nos. 16, 18, 20. The outlets 50 as shown in Fig. 4 comprise tubular members extending radially through the layer of insulation 47, 48, and also through the annular space 37.

Inspection doors as at 51 may be provided at the various hearths. These should be of a type which may be tightly clamped in case the furnace is to be used for processes requiring the substantial exclusion of air.

The spent gases may be withdrawn or allowed to escape from the furnace from above the upper hearth through a gas outlet 52 connected to a stack or other means for disposal.

Figure 2:
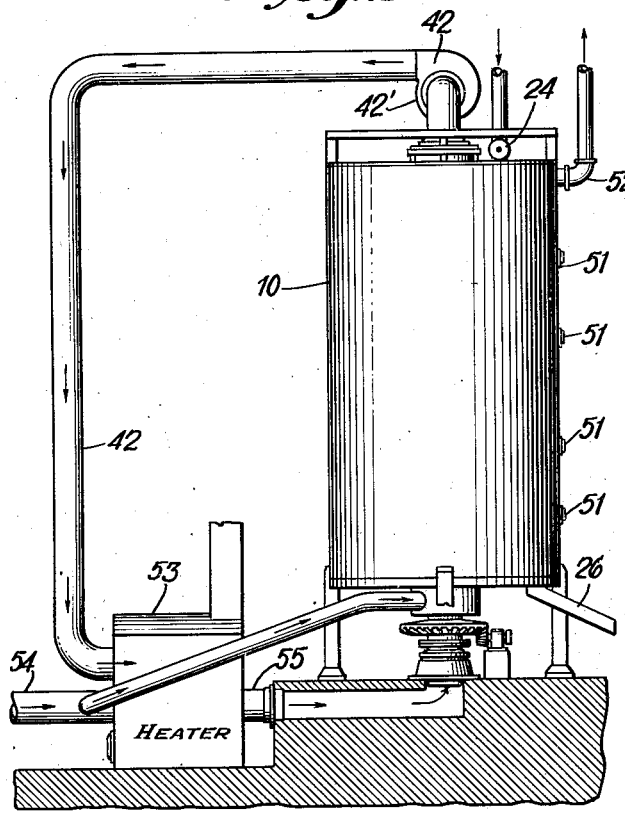
Fig. 2 is an elevational view of the furnace and an accompanying arrangement of preheating apparatus.
Figure 3:
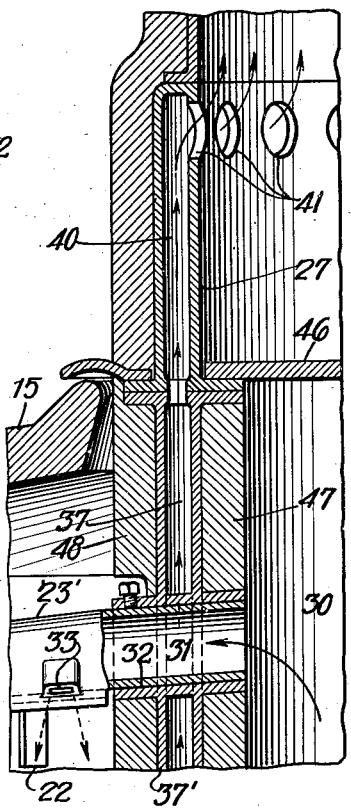
Fig. 3 is an enlarged vertical sectional view of a portion of the shaft structure of the furnace.

As shown in Fig. 2, the cooling gas stream after it leaves the furnace in somewhat heated condition through conduit 42, may be blown as by a blower 42' into preheating apparatus as at 53 and therein mixed with other gas coming from a suitable source of supply through conduit 54. After being heated to the desired temperature in the preheater, these gases may be conducted, as through conduit 55, into the lower end of the furnace shaft.

While in the example shown, the rabble arms at the six lower hearths are provided with openings for the discharge of gas, it will be understood that the rabble arms at a greater or lesser number of hearths may be thus equipped as circumstances may warrant. Also the number and size of the hearths may vary, depending upon the desired capacity of the furnace and the time required for the desired reactions to take place therein.

In case the material to be treated comprises magnetite, to be subjected to a reducing treatment, the gas used may comprise coke oven gas utilized before it has opportunity to become cooled. Also other gases such as natural gas, coal gas, by-product gas, or methane may be used after heating same in the preheater. In the case of magnetite treatment, the reduction may be carried on at a temperature of about 1300° F. or somewhat higher, but temperatures high enough to cause substantial fusion and stickiness of the ore particles should be avoided, and preferably the reaction should not be carried to completion, but interrupted when some 90% of the oxygen content of the magnetite has been removed. If a good grade of magnetite ore is used, the resulting product will be an uncontaminated alloy-free melting stock suitable for the iron and steel industry as a general substitute for scrap metal.

It will be understood that the above described construction in addition to being applicable to the reduction of ores, may also be used for processes where it is desired to apply hot blasts of air or other oxidizing gases to the material under treatment. Then as in the case with the use of reducing gases, the gas used for cooling purposes may preferably be the same kind of gas as supplied through the hot gas conduit 30. Hence if the hot and cold gas streams become mixed at leakage points, or elsewhere, no difficulties will be encountered and also the cooling gas after becoming somewhat heated, may be added to the hot gas stream, and its heat value thereby saved. However, of course, if preferred the cooling gas after leaving the furnace and passing through suitable conduits as at 42, may be reintroduced and recirculated through the cooling cavities of the rabble structure, instead of being mixed with the supply of hot gas. The gas streams may be admitted to the rabbling structure at a pressure for example in the neighborhood of 10 inches of water. This will insure effective blasts of gas against the ore being rabbled and yet such pressure will not be so high as to cause substantial leakage at the rabble arm sockets if constructed in accordance with the prevailing practice.

In the form of the furnace shown in Fig. 6, some of the parts corresponding to those of Fig. 1 are identified by the same reference numerals accompanied by prime marks. In this form the hot gas conduit 30' extends to the top of the central shaft where it is there blocked off by a cover plate 46' instead of being closed off at the mid portion of the furnace as in Fig. 1. Also in Fig. 6 the outer annular cooling gas conduit 37' extends to the top of the furnace. The cooling gas upon cooling the portions of the shaft in the lower and middle portions of the furnace, becomes somewhat heated and passes on into the annular conduit within the upper portions of the shaft. Then, instead of being conducted out of the furnace as in Figs. 1 and 2, the cooling gas stream in Fig. 6 may be discharged into the upper part of the furnace and on to the material being treated, thereby serving to somewhat preheat the material on the upper hearths. Such discharge of the gas from the annular shaft cavity may be accomplished either through openings as at 60 in the shaft walls or by forming certain of the rabble arms as at 23a with apertures as at 61 and by bringing the inner ends of these rabbles into communication with the annular cavity 37.

The structure of Fig. 6 is particularly adapted for use in cases where the cooling gas temperature becomes high enough within the upper portions of the shaft, so that it is economical to use the heat of this gas to directly preheat the incoming material on the upper hearths. Also the structure of Fig. 6 avoids the expense of providing any water-sealing means or the like with respect to any fixed conduit at the upper end of the rotatable central shaft.

It will be understood that the lower portions of the furnace of Fig. 6 as well as various other details of construction thereof, if desired, may be the same or similar to the structure in Fig. 1.

The socket structure shown in Fig. 7 may comprise a flange 62 surrounding an opening through the outer wall 37' of the central shaft. As shown in Figs. 7 and 8, the inner walls of the flange 62 may be formed with a plurality of cavities as at 63 spaced around the exterior walls of the inner end of the rabble arm 23 as received in the socket. These cavities at their inner ends communicate with the cooling gas conduit of the central shaft and serve to provide discharge ports opening into the furnace for discharging cooling fluid through the socket structures to insure proper cooling of the latter. It is particularly important in case high temperatures are used in the furnace, to properly cool the socket structures. Because of the irregular shape of the shaft castings at these areas, breakage or warping due to high temperatures is most likely to occur at these points. In Fig. 7 the improved socket cooling structure is shown in connection with a rabble arm 23 which communicates with the annular cooling gas cavity of the shaft. On the other hand, in Fig. 10 a similar form of improved socket cooling arrangement is shown in connection with a rabble arm 23' which communicates with the hot gas cavity 30 of the central shaft. That is, in Fig. 10 the arm socket extends through both the inner and outer walls of the annular cavity 37, the inner portion of the socket comprising a flange 64 formed on the inner shaft wall and opening into the central shaft cavity 30. In Fig. 10 the socket cooling cavities 62' correspond to cavities 62 of Figs. 6 and 7.

It will be understood that sockets as at Fig. 7 may for example be used for the rabble arms at the upper hearths of furnaces such as of Fig. 6, whereas the socket structure of Fig. 10 may be used for the rabble arms of the central and lower portions of the furnaces of Fig. 1 and Fig. 6.

In Figs. 7 and 10 the inner ends of the rabble arms are shown with orifice plates as at 65 fitted therein, these plates having central apertures as shown, of a size chosen to permit a predetermined proportion of the gas from the central shaft cavities to be discharged into each rabble arm. A face view of one of the orifice plates is shown in Fig. 9. These plates may be retained in the ends of the rabble arms as by forced fitting. Upon sliding out or replacing the rabble arms in the usual way for furnaces of this type, the orifice plates may readily be exchanged for others having apertures of appropriate size to meet various desired conditions within the furnace. That is, by selecting orifice plates with apertures of proper size, either the amount of hot gas or the amount of cooler gas introduced at different hearths may be varied to control the relative temperature conditions at the different hearths.

This application comprises a continuation in part of my copending application, Ser. No. 484,717, filed April 27, 1943.

What is claimed as new and desired to be secured by Letters Patent is:

1. A multiple superposed hearth furnace construction having a rotatable central shaft carrying rabble arms with rabble teeth at the various hearths for rabbling material under treatment over the hearths and from hearth to hearth down through the furnace, said arms being hollow and formed with apertures for discharging gas onto the material being rabbled, a conduit within said shaft substantially surrounded by a generally annular space, said conduit communicating with said hollow arms, means for supplying a preheated hot stream of reducing gas to said conduit for discharge through said apertures, means for conducting into and through said annular space, an independently supplied stream of relatively cool non-oxidizing gas, said cool gas serving to cool said shaft and conduit, and heat insulation means on the inner walls of said conduit and on the outer walls of said shaft.

2. A multiple superposed hearth furnace construction having a rotatable central shaft carrying rabble arms with rabble teeth at the various hearths for rabbling material under treatment over the hearths and from hearth to hearth down through the furnace, said arms being hollow and formed with apertures for discharging gas onto the material being rabbled, a conduit within said shaft substantially surrounded by a generally annular space, said conduit communicating with said hollow arms, means for supplying a preheated hot stream of reducing gas to said conduit for discharge through said apertures, and means for conducting into and through said annular space, an independent stream of relatively cool gas of a character which will not substantially promote combustion with said hot gas if mixed therewith, said cool gas serving to cool said shaft and conduit.

3. Rabbling structure for a multiple hearth furnace comprising a central rotatable vertical shaft formed of a plurality of sections joined together, a conduit extending longitudinally within said shaft, and hollow arms extending in generally horizontal directions and supported respectively from said sections, means bringing said arms into communication with said conduit, said arms being formed with apertures for discharging gas supplied through said conduit, onto the material being treated in the furnace, said conduit being substantially surrounded within said shaft by a generally annular cavity for cooling fluid, the parts being so constructed and arranged as to isolate said cavity from direct communication with the interiors of both said conduit and arms.

4. Rabbling structure for a multiple hearth furnace comprising a central rotatable vertical shaft, a hot gas conduit extending longitudinally within said shaft, hollow rabble arms supported from said shaft for extending over the hearths, means bringing said arms into communication with said conduit, said arms being formed with apertures for discharging hot gas supplied through said conduit, onto the material being treated on the furnace hearths, said conduit being substantially surrounded within said shaft by a generally annular cooling fluid cavity, heat insulation means on the inner walls of said conduit, and means for supplying a stream of cooling fluid to pass into and through said cavity independently of the hot gases supplied to the rabble arms.

5. The method of operating a multiple superposed hearth furnace with rotary rabbling structure, for subjecting material being treated therein to heat and to a reducing reaction, which comprises excluding air from the furnace while introducing a stream of preheated hot reducing gas through the rabbling structure and discharging same from the structure onto the material being rabbled within the furnace, and cooling a substantial part of said structure by passing therethrough an independent stream of a relatively cool fluid which is also a reducing gas, whereby combustion of the gas is avoided if said streams become mixed by leakage or otherwise.

6. The method of operating a multiple superposed hearth furnace with rotary rabbling structure, for subjecting material being treated therein to heat and to a reducing reaction, which comprises excluding air from the furnace while introducing a stream of preheated hot reducing gas through the rabbling structure and discharging same from the structure onto the material being rabbled within the furnace, and cooling a substantial part of said structure by passing therethrough a relatively cool independent stream of substantially the same type of gas, the latter gas thereby becoming heated, and thereafter adding the latter gas to the hot gas applied to the material.

7. The method of operating a multiple superposed hearth furnace with rotary rabbling structure, for subjecting material being treated therein to heat and to a non-oxidizing chemical reaction, which comprises excluding air from the furnace while introducing a stream of preheated hot reaction gas through the rabbling structure and discharging same from the structure at various points onto the material being rabbled within the furnace, and cooling a substantial part of said structure by passing therethrough a relatively cool independent stream of non-oxidizing gas.

8. The method of operating a multiple superposed hearth furnace with rotary rabbling structure, for subjecting material being treated therein to heat and to a non-oxidizing chemical reaction, which comprises excluding air from the furnace while introducing a stream of preheated hot reaction gas through the rabbling structure and discharging same from the structure at various points onto the material being rabbled within the furnace, and cooling a substantial part of said structure by passing therethrough a relatively cool independent stream of non-oxidizing gas, the latter gas thereby becoming heated, and thereafter adding the latter gas to the hot gas applied to the material.

9. The method of operating a multiple superposed hearth furnace with rotary rabbling structure, for subjecting material being treated therein to heat and to a reducing reaction, which comprises excluding air from the furnace while introducing a stream of preheated hot reducing gas through the rabbling structure and discharging same from the structure onto the material being rabbled within the furnace, cooling a substantial part of said structure by passing therethrough an independent stream of a relatively cool fluid which is also a reducing gas, the latter gas thereby becoming heated, and discharging the latter heated gas into the presence of the material on an upper hearth.

10. A multiple superposed hearth furnace construction having a rotatable central shaft carrying rabble arms with rabble teeth at the various hearths for rabbling material under treatment over the hearths and from hearth to hearth down through the furnace, at least some of said arms being hollow and formed with apertures for discharging gas into the material being rabbled, said shaft being formed with a hot gas cavity communicating with said hollow arms and also formed with a cooling gas cavity, separate means for respectively conducting hot gas and cooling gas into said cavities, and means for discharging the cooling gas from its cavity independently of the discharge of the hot gas.

11. A multiple superposed hearth furnace construction having a rotatable central shaft carrying rabble arms with rabble teeth at the various hearths for rabbling material under treatment over the hearths and from hearth to hearth down through the furnace, at least some of said arms which are below the upper hearth, being hollow and apertured for discharging gas onto the material being rabbled, said shaft being formed with a hot gas cavity communicating with said hollow arms and also formed with a cooling gas cavity, separate means for respectively conducting hot gas and cooling gas into said cavities, and means for discharging the cooling gas from its cavity into the furnace at one or more of the upper hearths, whereby the cooling gas after becoming heated in the shaft, may be utilized to heat the material in the upper part of the furnace.

12. Rabbling structure for a multiple superposed hearth furnace, comprising a central rotatable vertical shaft assembly formed with a cooling fluid conduit therein, rabble arms extending generally horizontally from said shaft, the shaft being formed with sockets for receiving said arms, and said sockets being formed with cavities external to the arm portions received in the sockets, said cavities communicating with said cooling conduit and opening into the furnace at spaced points about said arm portions for discharging cooling fluid through the socket structures for cooling the latter and said arm portions.

13. Rabbling structure for a multiple superposed hearth furnace, comprising a central rotatable vertical shaft assembly formed with a hot gas conduit and also a cooling fluid conduit therein, hollow rabble arms extending generally horizontally from said shaft, the shaft being formed with sockets for receiving said arms and for bringing the hollow interiors of the arms into communication with said hot gas conduit, and said sockets being formed with cavities external to the arm portions received in the sockets, said cavities communicating with said cooling conduit and opening into the furnace for discharging cooling fluid through the socket structures for cooling the latter.

CHARLES W. NICHOLS, Jr.